2,778,724
PROCESS FOR PRODUCTION OF METALLIC IRON CONCENTRATES AND TITANIUM DIOXIDE CONCENTRATES FROM ORES CONTAINING ILMENITE

Olav Moklebust, Hauge i Dalane, Norway, assignor to National Lead Company, New York, N. Y., a corporation of New Jersey No Drawing. Application December 31, 1953,
Serial No. 401,712
Claims priority, application Norway February 9, 1953
9 Claims. (Cl. 75—30)

This invention relates to a process for producing metallic iron concentrates and titanium dioxide concentrates from ilmenite ores.

The usual raw materials for the titanium industry are ilmenite ores and ilmenite concentrates whose main constituents are iron oxides and $TiO_2$. If concentrates with a higher content of $TiO_2$ are desired, the iron oxides must be removed.

A part of the iron oxides in ilmenite may be persent in the form of more or less finely divided individual magnetite crystals, $Fe_3O_4$, and another part in the form of $Fe_2O_3$ in small bands scattered in the ilmenite particles. The main quantity of the iron oxides, is, however, usually present in combined state in the ilmenite molecule itself, $FeOTiO_2$, and this part of the iron content cannot be separated out by the usual methods of ore dressing.

Several methods for separating the iron and $TiO_2$ in ores are previously known, such as smelting, whereby the iron is separated out in molten state and a rich $TiO_2$ concentrate is obtained in the form of slag. Methods are also known for reducing the iron oxides of the ilmenite to finely divided metal at low temperature, about 1000–1100° C. with subsequent extraction of the iron with acids, salts or the like. Common to both above mentioned methods is the reoxidations of iron and removal thereof in the form of less valuable products as iron oxides or iron salts.

An object of the instant invention is to provide a method for recovering iron in the form of a metallic product from ilmenite ores. Another object is to prepare a metallic iron concentrate and a titanium dioxide concentrate from ilmenite ores. Still another object is to provide a low temperature process for separating the iron and titanium values in ilmenite ore. These and other objects will become more apparent from the following description of the instant process.

According to the present invention the iron is separated out in the form of a highly valuable metallic iron product and at the same time a $TiO_2$ concentrate is recovered having a higher $TiO_2$ content than usual with other methods. This is attained by carrying out the reduction of ilmenite within a definite temperature interval under addition of definite slag-forming agents with subsequent grinding of the reduced ore for liberation and separation of the metallic iron.

According to the broad aspects of the present invention ore containing ilmenite is mixed with a sodium component or a mixture of sodium compounds which, when the mixture is heated to about 1100–1200° C. in the presence of a solid carbonaceous reducing agent, for example, coke fines, to reduce the iron oxides of the ore to metallic iron, will be transformed to $Na_2O$, which will be found in the slag in combined form. The quantity of sodium compounds added is so chosen that the proportion between $TiO_2$ and $Na_2O$ in the slag will be between 25 and 35. Upon cooling of the reduced material the excess of coke, gangue, ashes and other impurities is separated from the reduced ilmenite by washing or magnetic separation, if required after crushing. The excess coke is recovered and returned to the process.

The grains of the reduced ilmenite are not fused, but still individual, within each grain a "low temperature melting" has, however, taken place, whereby the slag-forming addition, in this case $Na_2O$ from the added sodium compounds, has reacted with $TiO_2$ and formed a slag of such viscosity that the finely divided metallic iron in the ilmenite grains has formed particles of such size that they can be isolated by crushing and separation. The slag, however, is not of such viscosity that the ore grains are rendered sticky. The reduced ilmenite is then finely ground, preferably to about 200–325 mesh (Tyler standard screen scale sieves), and the liberated metallic iron particles are then separated out by magnetic and/or gravimetric methods in known way.

Tests have shown that the combination of the right reduction temperature and the slag-forming addition is of decisive importance to the process. It is not sufficient that only one of these conditions be correctly chosen. This is illustrated in the following example:

A source material was provided which was an ilmenite concentrate with a grain size of about 20 mesh and which contained 44% $TiO_2$, 35% $FeO$, and 12.5% $Fe_2O_3$. For comparative purposes three tests were carried out with this material at different reduction temperatures and with varying amounts of slag-forming addition.

Test A

Fifty parts by weight of the source material ilmenite was mixed with 15 parts of coke breeze. The mixture was placed in a covered crucible and reduced at 1160° C. for 3 hours. After cooling the reduced mixture was separated on a Witherill magnetic separator for removal of surplus coke, gangue, and ashes. The metallized ilmenite, so obtained, analyzed 37.6% metallic iron. This product was ground to particles of 325 mesh and subjected to magnetic separation in order to obtain fractions having analyses as shown in Table 1.

Test B

To a mixture of 50 parts of ilmenite and 15 parts of coke breeze as employed in Test A was added 1.5 parts of soda ash. This mixture was reduced at a temperature of 1070° C. for 3 hours according to the procedure previously outlined. After removal of the surplus coke, gangue, and ashes the metallized ilmenite analyzed 20% metallic iron. This product was also ground to 325 mesh and magnetically separated. Analyses of the fractions which were obtained is also given in Table 1.

Test C

A mixture consisting of the same proportions of ilmenite, coke breeze and soda ash as employed in Test B was reduced and subsequently treated under identical conditions except that the reducing temperature was maintained at 1160° C. The metallized ilmenite analyzed 39.2% metallic iron. The fractions after magnetic separation were analyzed and the results are indicated in Table 1.

TABLE 1

[Analyses of fractions from magnetic separation operation.]

|  | Test A | Test B | Test C |
|---|---|---|---|
|  | Percent | Percent | Percent |
| Iron Concentrate: |  |  |  |
| Weight percent | 30 | 31 | 35.9 |
| Metallic Fe | 62.3 | 55.0 | 85.0 |
| Total Fe | 68.5 | 66.0 | 90.6 |
| $TiO_2$ | 26.6 | 27.0 | 5.0 |
| $TiO_2$ Concentrate: |  |  |  |
| Weight percent | 70 | 69 | 64.1 |
| $TiO_2$ | 54.4 | 51.1 | 71.5 |
| Metallic Fe | 14.5 | 2.3 | 3.2 |
| Total Fe | 28.7 | 25.1 | 12.6 |

Microscopic examination of the reduced or metallized products prior to crushing showed that samples A and B contained small amounts of iron pearls apparently derived from magnetite and $Fe_2O_3$. These components are more easily reduced than the molecular iron of ilmenite, $FeOTiO_2$, and will more easily flow to form metallic particles than will the molecular iron formed within a skeleton of $TiO_2$. To make the molecular iron gather in particles the viscosity of the $TiO_2$ skeleton must be sufficiently reduced by additions to permit such formation. In example C a sintering or fusion had apparently taken place within each grain and iron particles judged to be of a size about 200–325 mesh were distinctly observed.

Test A without addition of soda shows that even if the reduction temperature is 1160° C. and practically all iron in the ilmenite is reduced to metal, it will not be present in such a state that it can be removed by crushing and separation. Test B, carried out at lower temperature (1070° C.), but with addition of soda, shows that this reduction temperature is too low to cause separation of the molecular iron. Test C, carried out at a temperature (1160° C.), which is within the temperature range of the invention, but with addition of soda shows that very good concentrates of iron and $TiO_2$ can be obtained. The minimum concentration of iron and $TiO_2$ attained in tests A and B is due to the metallic iron originating from the magnetite and $Fe_2O_3$ components of the original ilmenite.

Tests with varying amounts of soda addition show that about 3% of the weight of the ilmenite is sufficient to give satisfactory results. The soda enters the slag as $Na_2O$. Analysis of the slag from the same ilmenite shows substantially constant $Na_2O$ content of 2–3% in spite of varying soda addition during the reduction.

A part of the soda addition may be replaced by cheaper alkali compounds, for example, $NaCl$, $Na_2SO_4$ etc. which during the reducing heating will be transformed to $Na_2O$.

The use of alkaline earth compounds, for example $CaO$, $MgO$, $CaCl_2$, $MgCl_2$ etc., as slag-forming additions instead of alkali has not given satisfactory results at 1160° C. This temperature is probably too low to give the alkaline earths the required low viscosity. Titanium ores usually contain a certain amount of alkaline earths, aluminum—and silicon oxides which are also of importance to the slag formation. Slag-forming additions must therefore to a certain extent be adjusted for each ore.

The slag-forming additions are further of importance to the solubility of the $TiO_2$ slag in acids. The $TiO_2$ slags with 2–3% $Na_2O$ and 70–78% $TiO_2$ have shown good solubility in sulphuric acid with $TiO_2$ outputs of about 92%.

As above shown the reduction temperature is of great importance. The best results have been obtained at temperatures between 1150 and 1200° C., but acceptable results have been obtained at temperatures as low as 1100° C. When using temperatures above 1200° C. the reduction charge will usually sinter or melt. The excess coke, gangue and ashes from burnt coke will enter the sinter or melt of the reduced ilmenite and increase the amount of impurities both in the iron and in the slag product.

The reduced material is cooled, preferably in water, to facilitate its crushing, and is then ground to liberate the metallic iron particles. These vary in size from about 150 mesh to about 325 mesh depending on whether the iron comes from various sizes of magnetite and $Fe_2O_3$ grains or from molecular iron oxide. The main quantity of this latter has particle sizes of about 325 mesh. The slag is more easily crushed than the metallic iron. Tests show that already at an early stage of the crushing to about 200 mesh about 80% of the slag product may be separated out in the form of slag very rich in $TiO_2$, about 78.6% $TiO_2$. The iron product is then further crushed to liberate the rest of the slag product with a lower $TiO_2$ content.

The following figures show the composition of a typical iron concentrate and of the corresponding slag product produced from an ilmenite with 44% $TiO_2$.

TABLE 2

| | Ilmenite | Reduced Ilmenite | Iron Concentrate | $TiO_2$ Slag |
|---|---|---|---|---|
| Weight percent | Percent | Percent 100 | Percent 40.3 | Percent 59.7 |
| $TiO_2$ | 44.0 | 48.5 | 3.3 | 73.9 |
| Total Fe | 36.0 | 41.6 | 91.1 | 9.3 |
| Met. Fe | 0.0 | 37.1 | 82.6 | 1.5 |
| $SiO_2$ | 2.8 | 3.0 | | 5.4 |
| MgO | 3.8 | 4.0 | | 6.0 |
| CaO | 0.35 | 0.4 | | 0.6 |
| $Na_2O$ | 0.0 | 2.0 | | 2.5 |
| V | 0.1 | 0.1 | 0.0 | 0.2 |
| Cr | 0.02 | 0.02 | 0.03 | 0.00 |
| S | 0.26 | | 0.15 | |

It will be seen that a very good concentration of Fe and $TiO_2$ is obtained. Both iron concentrate and $TiO_2$ concentrate are of good quality.

The iron concentrate is a fine metallic powder which upon agglomeration by briquetting or the like forms an excellent material for steel production. The sulphur content of the iron concentrate 0.15%, is relatively high. Tests show that it can be lowered considerably by roasting or sintering the ilmenite before treatment. By this procedure iron concentrates with a sulphur content of about 0.03% have been obtained.

On account of the sulphur content and the apparatus employed it may be advantageous to sinter or agglomerate the ilmenite, for example, by making pellets, before subjecting it to reduction. The slag-forming material is then added to the ilmenite before sintering whereby the added material will enter the sintered particles or the pellets.

It has been demonstrated by the preceding description and example that the instant invention provides a valuable and efficient method for separating the iron and titanium values in ilmenite. According to the instant process there is formed not only a titaniferous concentrate having unusually high titanium dioxide content but also a metallic iron concentrate which may subsequently be employed in a profitable manner in the production of steel or the like.

While this invention has been described and illustrated by the example, it is not intended to be strictly limited thereto, and other modifications and variations may be employed within the scope of the following claims.

I claim:
1. Process for producing a metallic iron concentrate and a titanium dioxide concentrate from ilmenite containing material which comprises forming an admixture of said ilmenite containing material and at least one compound of sodium, reducing said admixture at a temperature of from about 1100° C. to about 1200° C. in the presence of a solid carbonaceous reducing agent, whereby the ilmenite containing material is reduced without sintering or melting, cooling the reduced product, removing excess reducing agent, gangue, and ashes, grinding the reduced ilmenite containing material to fine particle size and separating same into an iron concentrate and a titanium dioxide concentrate, the sodium compound being added in an amount so that the proportion $TiO_2/Na_2O$ is between 25 and 35 in said titanium dioxide concentrate.

2. Process according to claim 1 wherein said admixture is reduced at from 1150° C. to 1200° C.

3. Process according to claim 1 wherein the ilmenite containing material is admixed with soda ash.

4. Process according to claim 1 wherein the ilmenite containing material is admixed with soda ash and sodium chloride.

5. Process according to claim 1 wherein about 3 percent of soda ash by weight of ilmenite containing material is employed.

6. Process according to claim 1 wherein the reduced ilmenite containing material, after removal of excess reducing agent, gangue, and ashes, is ground to about 200-325 mesh.

7. Process according to claim 1 wherein the finely ground reduced ilmenite containing material is separated into an iron concentrate and a titanium dioxide concentrate by magnetic separation operation.

8. Process according to claim 1 wherein the finely ground reduced ilmenite containing material is separated into an iron concentrate and a titanium dioxide concentrate by gravimetric separation operation.

9. Process according to claim 1 wherein the ilmenite ore, prior to being admixed with the sodium compound, is roasted, and the reduction of the admixture is carried out in the presence of calcium compounds whereby sulphur is prevented from entering the iron.

References Cited in the file of this patent

UNITED STATES PATENTS 2,537,229    McLoren _____ Jan. 9, 1951

OTHER REFERENCES

Fiat Final Report 773, "Titanium Products in Germany," May 3, 1946, pages 20-22.